A. E. JAMES.
ATTACHMENT FOR SHOVELS AND SPADES.
APPLICATION FILED DEC. 22, 1913.
1,109,758.
Patented Sept. 8, 1914
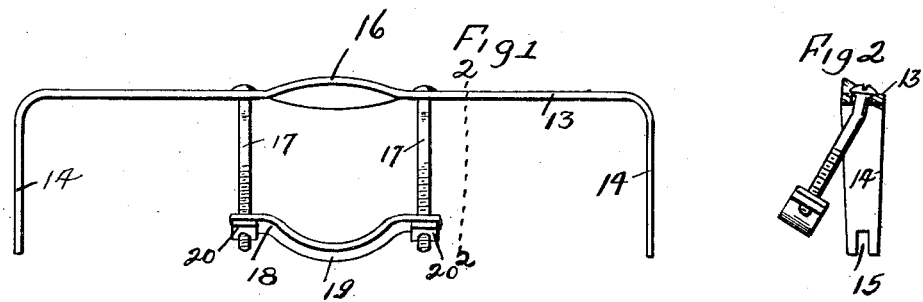
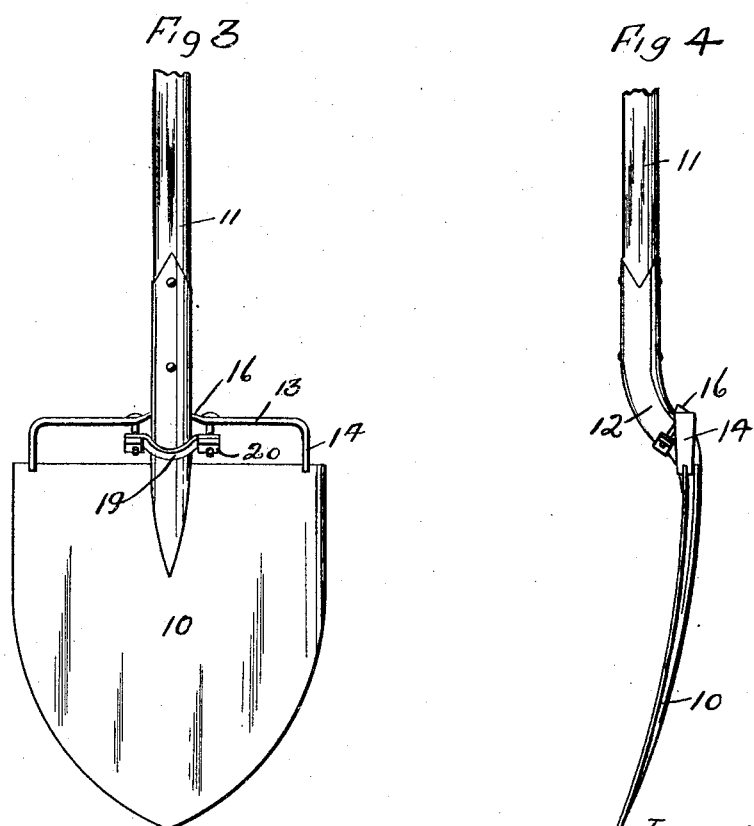
Witnesses.
Inventor.
Arthur E. James,
By Orwig & Bair
Attys

UNITED STATES PATENT OFFICE.

ARTHUR E. JAMES, OF SEARSBORO, IOWA.

ATTACHMENT FOR SHOVELS AND SPADES.

1,109,758.   Specification of Letters Patent.   Patented Sept. 8, 1914.

Application filed December 22, 1913. Serial No. 808,506.

*To all whom it may concern:*

Be it known that I, ARTHUR E. JAMES, a citizen of the United States, and resident of Searsboro, in the county of Poweshiek and State of Iowa, have invented a certain new and useful Attachment for Shovels and Spades, of which the following is a specification.

The object of my invention is to provide an attachement for shovels and spades of simple, durable and inexpensive construction, arranged to be mounted on the shovel or spade and to furnish a broad support for the foot for forcing the spade or shovel into the ground.

More particularly, it is my object to provide such an attachment which may be quickly and easily attached to the curved neck of a shovel or spade handle in such manner as to present a broad surface on each side of the handle to the foot of the user and to have a support at the outer end resting upon the upper part of the spade or shovel blade.

My invention consists in certain details, in the construction, combination and arrangement of the various parts of the device, whereby the objects contemplated are attained, as hereinafter more fully set forth, pointed out in my claims, and illustrated in the accompanying drawing, in which:

Figure 1 shows a front elevation of an attachment for spades and shovels, embodying my invention. Fig. 2 shows a transverse, vertical, sectional view through the same, taken on the line 2—2 of Fig. 1. Fig. 3 shows a front elevation of a shovel with an attachment embodying my invention installed thereon, and Fig. 4 shows a side elevation of the shovel and attachment, shown in Fig. 3.

In the accompanying drawings I have used the reference numeral 10 to indicate generally the blade of a shovel of the kind used in ditches and the like. Secured to the blade 10 is a handle 11, which is of ordinary construction, having the forwardly curved portion 12 just in front of and above the upper central portion of the blade 10.

My improved attachment comprises a flat horizontal bar 13, having downwardly extending portions 14 at its ends. In the lower ends of the portions 14 are notches 15, adapted to receive the upper edge of the shovel blade, as clearly shown in Fig. 4. The forward edge of the bar 13, at the central portion thereof, is bent upwardly and away from the horizontal plane in which the main portion of the bar 13 rests at 16 and the portion 16 is curved to fit the top of the curved neck 12 of the shovel, as shown in Figs. 3 and 4, when the portions 14 are installed in position.

Formed in the bar 13, on each side of the portion 16, is a hole to receive a screw theraded bolt 17. The screw threaded bolts 17, near the bar 13, are bent so that the screw threaded portion thereof extends forwardly and away from the vertical plane in which the bar 13 and portions 14 lie, as clearly shown in Fig. 2.

Loosely mounted on the screw threaded ends of the bolt 17 is a bar 18, having a central curved portion 19, designed to engage and fit against the front lower portion of the curved neck 12 of the handle 11, as shown in Figs. 3 and 4. The bolts 17 are curved, as hereinbefore described, so that the portions 16 and 17 may firmly engage the neck 12 on each side thereof in a plane at right angles to the longitudinal axis of the neck 12, where it is engaged by said parts. The device, as hereinbefore described, engages the handle firmly and nuts 20 are screwed on the ends of the bolts 17 to hold the bar 18 in position. The bar 13 is preferably made of tough material, capable of being bent slightly to make it fit shovel handles of slightly varying sizes.

On account of the arrangement of the portions 16 and the curved bolts 17, the attachment as shown will fit a great variety of shovels, and by slightly varying the shape of the portion 16 it can be used on almost any shovel.

The advantage of the flat surface of the bar 13 for forcing the shovel into the ground is obvious. The attachment may be quickly and easily installed in position, may be readily removed at any time, and is made of such material that it will ordinarily outlast a shovel.

It will be understood that some changes may be made in the details of the construction of my device, without departing from its essential features, and it is my intention to cover by this application any such changes which may be included within the scope of the following claims:

I claim as my invention:

1. In a device of the class described, a flat horizontal bar, having vertical, downward extensions at its ends, the forward edge of said bar at its central portion being bent upwardly and curved to fit the neck of a spade or shovel, bolts extended through said bar on each side of said curved portion, and a curved bar detachably mounted on the ends of said bolts and designed to engage the front lower portion of the shovel handle.

2. In a device of the class described, a flat horizontal bar, having vertical, downward extensions at its ends, the forward edge of said bar at its central portion being bent upwardly and curved to fit the neck of a spade or shovel, bolts extended through said bar on each side of said curved portion, and a curved bar detachably mounted on the ends of said bolts and designed to engage the front lower portion of the shovel handle, said bolts being bent near said bar so that their lower portions extend forwardly and downwardly from the bar to permit the central portion of the first bar and said bar for connecting the ends of the bolts to lie in a plane at right angles to the longitudinal axis of the shovel handle, where it is encircled by said attachment.

3. In a device of the class described, a flat horizontal bar, having vertical, downward extensions at its ends, the forward edge of said bar at its central portion being bent upwardly and curved to fit the neck of a spade or shovel, bolts extended through said bar on each side of said curved portion, and a curved bar detachably mounted on the ends of said bolts and designed to engage the front lower portion of the shovel handle, said bolts being bent near said bar so that their lower portions extend forwardly and downwardly from the bar to permit the central portion of the first bar and said bar for connecting the ends of the bolts to lie in a plane at right angles to the longitudinal axis of the shovel handle, where it is encircled by said attachment, said downward extension and end portions being provided with central slots at their lower ends to receive the upper portion of a shovel blade.

Des Moines, Iowa, December 16, 1913.

ARTHUR E. JAMES.

Witnesses:
CHARLES W. CLARK,
JENNIE ALLELY.